US006296265B1

(12) United States Patent
Lovins

(10) Patent No.: US 6,296,265 B1
(45) Date of Patent: Oct. 2, 2001

(54) RECLINER WHEELCHAIR HAVING ADJUSTABLE PIVOT POINT

(75) Inventor: Terrence F. Lovins, Platteville, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/166,356

(22) Filed: Oct. 5, 1998

Related U.S. Application Data

(60) Provisional application No. 60/061,165, filed on Oct. 6, 1997.

(51) Int. Cl.[7] ..... B60N 1/06

(52) U.S. Cl. ..... 280/250.1; 280/304.1; 297/354.13

(58) Field of Search ..... 297/354.13, 354.1, 297/357, 363, 377, 353, 358; 180/907; 280/250.1, 304.1, 642, 47.38

(56) References Cited

U.S. PATENT DOCUMENTS

| | | | | |
|---|---|---|---|---|
| 3,618,968 | | 11/1971 | Greer | 280/47.11 |
| 3,881,773 | * | 5/1975 | Rodaway | 297/377 |
| 4,371,183 | * | 2/1983 | Dion | 280/42 |
| 4,592,570 | * | 6/1986 | Nassiri | 280/650 |
| 4,632,450 | | 12/1986 | Holdt | 297/84 |
| 4,655,471 | * | 4/1987 | Peek | 280/657 |
| 4,691,962 | | 9/1987 | Holdt | 297/84 |
| 4,744,578 | | 5/1988 | Stearns | 280/242 WC |
| 4,763,951 | * | 8/1988 | Silverman | 297/354 |
| 4,974,905 | | 12/1990 | Davis | 297/377 |
| 5,292,144 | * | 3/1994 | Sosnoff | 280/304.1 |
| 5,297,021 | * | 3/1994 | Koerlin et al. | 180/907 |
| 5,549,357 | | 8/1996 | Counts et al. | 297/354.13 |
| 5,823,621 | * | 10/1998 | Broadhead | 297/354.13 |
| 5,836,648 | * | 11/1998 | Karschlin et al. | 297/216.14 |

OTHER PUBLICATIONS

Sunrise Medical Inc. MMG, Quickie Manual Product Parts Manual, Jan. 1996 pp. 1.4,2.8,8.9,9.1,9.12 and 9.16.

* cited by examiner

*Primary Examiner*—Brian L. Johnson
*Assistant Examiner*—Avraham H. Lerner
(74) *Attorney, Agent, or Firm*—MacMillan, Sobanski & Todd, LLC

(57) ABSTRACT

A wheelchair provides for raising and lowering of the pivot point of the seat back to accommodate both the occupants particular body features (i.e., the occupant's torso pivot point) and the height or thickness of the seat cushion. The wheelchair is adapted to maintain the relatively close positions of the pivot points of both the wheelchair seat back and the back or torso of the wheelchair occupant.

5 Claims, 7 Drawing Sheets

RECLINER WHEELCHAIR HAVING ADJUSTABLE PIVOT POINT

CROSS-REFERENCE TO RELATED APPLICATIONS

This application claims the benefit of U.S. Provisional Application No. 60/061,165, filed on Oct. 6, 1997.

TECHNICAL FIELD

This invention relates in general to wheelchairs, and in particular to reclining wheelchairs suitable for positioning the wheelchair occupant at various orientations. More particularly, this invention pertains to a recliner wheelchair having adjustable pivot point.

BACKGROUND OF THE INVENTION

Several different types of wheelchairs have been developed to enable wheelchair occupants to have mobility in their everyday lives. Traditional or standard wheelchairs have a frame, a seat, a rigid or fixed seat back, large rear drive wheels, and smaller front caster wheels. Typically, the seat back has push handles for pushing by an attendant. The seat usually comprises a rigid seat frame and a seat cushion. Also, the rear wheels are positioned so as to be easily accessible to the wheelchair occupant to allow the wheelchair occupant to propel him or herself with greater ease.

In contrast to a standard wheelchair, a recliner wheelchair is adapted to have the seat back pivotally mounted so that the seat back can tilt backward. The reclining wheelchair is necessary or desirable for some wheelchair occupants for various reasons, such as the need to provide greater support for the occupant's head and trunk than is possible with a standard wheelchair. For example, a person with a head injury may need a recliner wheelchair to allow the best possible positioning of his or her immobilized head during a period of healing. The reclining wheelchair requires that the rear wheels be positioned significantly rearward of the pivot point because when the occupant reclines the seat back, the center of gravity shifts rearward.

Some people in need of a wheelchair are first confronted with the need for a recliner wheelchair, such as during a period of recovery from an injury, and then find that they need a standard wheelchair. Such wheelchair occupants have been required to purchase or otherwise acquire two different wheelchairs at considerable expense. It would be advantageous if some means could be developed to provide a wheelchair that could function both as a recliner wheelchair and as a standard wheelchair.

SUMMARY OF THE INVENTION

The above object as well as other objects not specifically enumerated are achieved by a wheelchair that provides for raising and lowering of the pivot point of the seat back to accommodate both the occupant's particular body features (i.e., the occupant's torso pivot point) and the height or thickness of the seat cushion. Accordingly, the wheelchair of the invention is adapted to maintain the relatively close positions of the pivot points of both the wheelchair seat back and the back or torso of the wheelchair occupant.

DETAILED DESCRIPTION OF THE INVENTION

Figure 1:
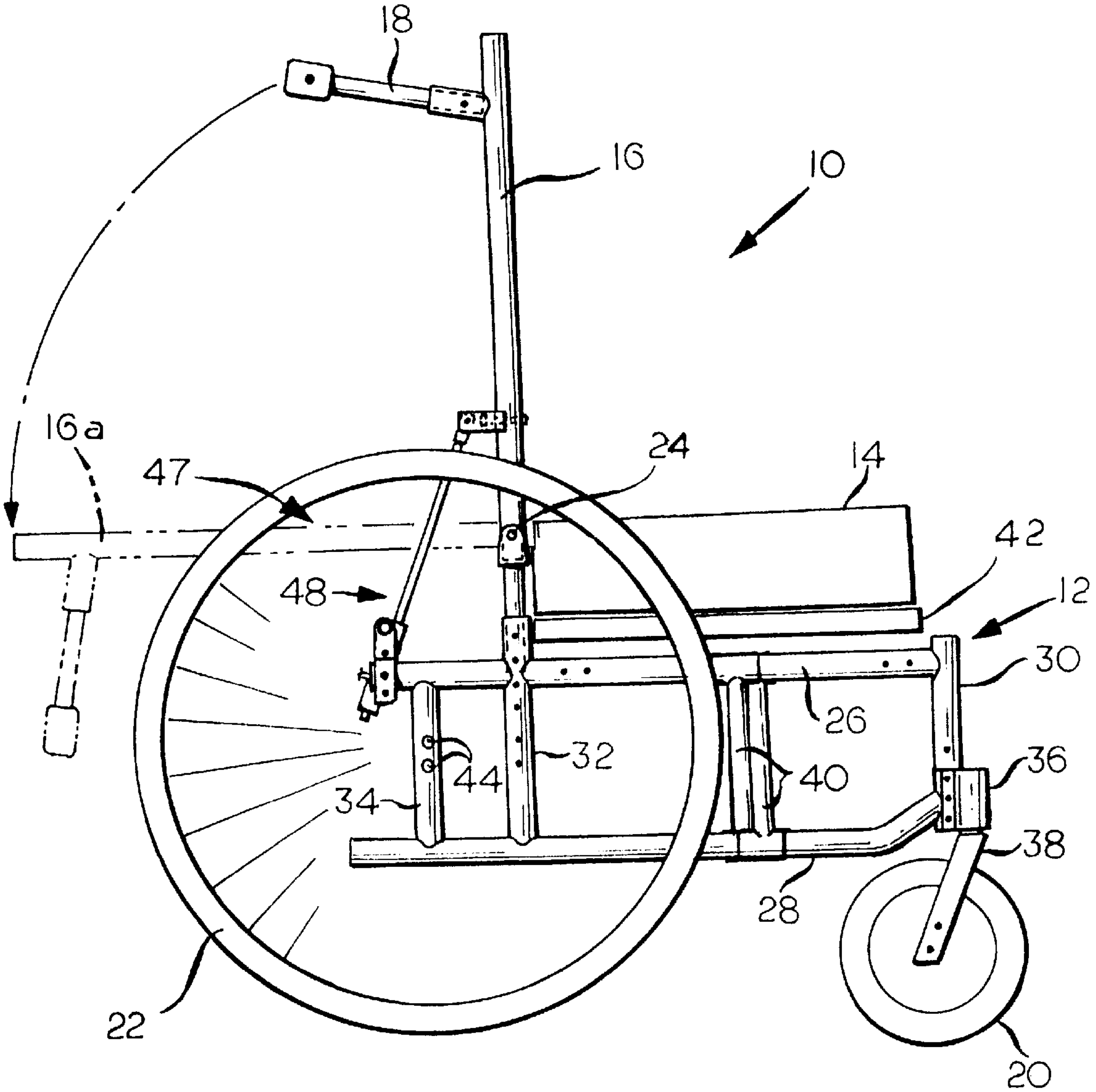
FIG. 1 is a schematic view in elevation of a convertible wheelchair, shown in a reclining mode, and further showing the seat back reclined in phantom lines.

As shown in FIG. 1, a wheelchair is indicated generally at 10. The wheelchair 10 is generally comprised of a side frame 12, on which is mounted a seat 14 and a seat back 16. A stabilizer assembly 18 is mounted on the seat back 16 so that another person can push the wheelchair 10. The side frames 12 provide a mounting for the front caster wheels 20 and rear drive wheels 22. The seat back 16 is mounted at pivot points 24 so that the seat back 16 can be pivoted and fixed at numerous angles, and can even be moved to a generally horizontal position, indicated at 16A as shown in phantom lines. The feature allowing the seat back 16 to pivot enables the occupant of the wheelchair 10 to be disposed in various reclining positions, including a lying down or prone position. It will be appreciated by those skilled in the art that various body positioning accessories, such as head supports, hip supports and knee supports, all not shown, can optionally be mounted on the wheelchair 10.

The side frame 12 is generally comprised of top tube 26 and bottom tube 28, which are oriented generally horizontally. The top tube 26 and bottom tube 28 are joined together by front tube 30, the back tube 32 and the rear tube 34, all oriented generally vertically. The rear wheels 22 are mounted in the rear tube 34 for rotation. Since the center of gravity of the wheelchair 10 can change with different angles of recline of the seat back 16, it is important that the rear tube 34 be positioned considerably rearward of the back tube 32. It is preferred that the rear tube 34 be positioned about 4 inches rearward (based on centers) of the back tube 32. Positioned on the front tube 30 is the caster housing 36, from which the caster fork 38 and the caster wheels 20 are rotatably mounted. The various tubes 26, 28, 30, 32 and 34 all comprise the side frame 12. There is a substantially identical side frame 12 on each side of the wheelchair 10, and these side frames 12 are joined together by folding cross braces 40, as shown partially in FIG. 1.

A seat frame 42 is positioned on the side frame 12, and the seat 14 is mounted on the seat frame 42. The rear tube 34 is provided with axle orifices 44 for rotatably mounting the rear wheel 22 to the side frame 12. Two axle orifices 44 are provided to allow a height adjustment, although more than two axle orifices could be provided. One of the considerations necessary for safe operation of a reclining wheelchair 10 is that the wheelchair 10 be stable under all possible reclining positions. As the seat back 16 is reclined farther, the center of gravity moves rearward. It can be seen that the rear tube 34 is positioned substantially rearward of the back tube 32, thereby providing good stability for the wheelchair 10 when the seat back 16 is fully reclined to the position indicated at 16A.

Figure 2:
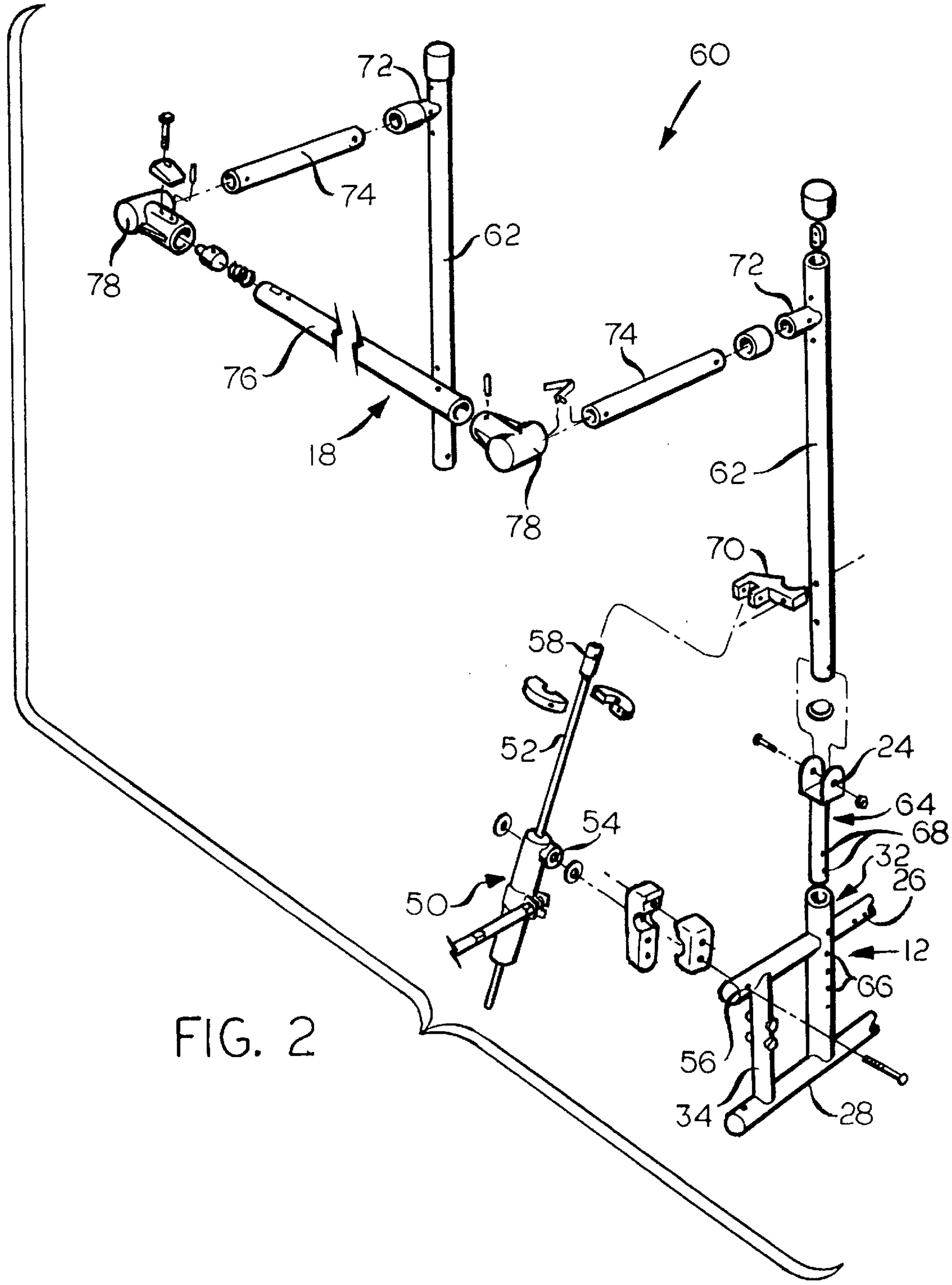
FIG. 2 is an enlarged schematic exploded view in perspective of the supporting apparatus for the reclining wheelchair of FIG. 1.

In order to support the seat back 16 in a desired reclining position and to support, secure or lock the seat back 16 in that position, an adjustable brace system 47 comprising a pair of braces 48 are provided. As shown more clearly in FIG. 2, the braces 48 are comprised of a housing 50 and an extensible rod 52 that can be moved axially relative to the housing 50. The housing 50 is provided with a bolt hole 54 for attachment with a corresponding bolt hole 56 in the side frame 12, and the extensible rod 52 is provided with a bolt hole 58 for connection with the seat back 16 (shown in FIG. 1). It should be understood that the housing 50 may be attached directly or indirectly to the side frame 12 so long as the braces 48 are removably and pivotally mounted relative to the side frames 12 and the reclining seat back 16.

The seat back frame, indicated generally at 60, is comprised generally of seat back tubes 62 and the stabilizer assembly 18. The seat back tubes 62 are pivotally mounted on pivot points 24 of pivot brackets 64 so that the seat back 16 (shown in FIG. 1) can recline rearwardly about left and right pivot points 24. The pivot brackets 64 are insertable into the hollow back tube 32. Both the back tube 32 and the pivot brackets 64 are provided with several orifices 66 and 68, respectively. The orifices 66 and 68 enable a height adjustment of the pivot tubes 64, and hence, a height adjustment of pivot points 24 and the entire seat back 16. This height adjustment is advantageous to accommodate seat cushions 14 (shown in FIG. 1) of different thicknesses.

Mounted on the seat back tubes 62 are brackets 70 for engagement of the extensible rod 52 of the back brace 48. It can be seen that the swivel attachment of the back brace 48 to the seat back tubes 62 allows the seat back 16 to be supported at various angles of recline.

The seat back tubes 62 are provided with tube spurs 72 extending rearwardly for mounting the stabilizer assembly 18. The stabilizer assembly 18 is generally comprised of stabilizer bar side braces 74, rear stabilizer bar 76, and stabilizer locking sockets 78. The stabilizer bar side braces 74 are mounted to the tube spurs 72. The rear stabilizer bar 76 is connected to the stabilizer bar side braces 74 by the stabilizer locking sockets 78. The entire stabilizer assembly 18 can be quickly disassembled and removed, or at least partially removed, from the seat back 16 to enable the wheelchair 10 to be folded when desired. Further, the stabilizer assembly 18, by use of the locking sockets 78, provides a strong, stable or substantially rigid connection between the left and right seat back tubes 62, thereby adding rigidity to the entire seat back 16.

Figure 3:
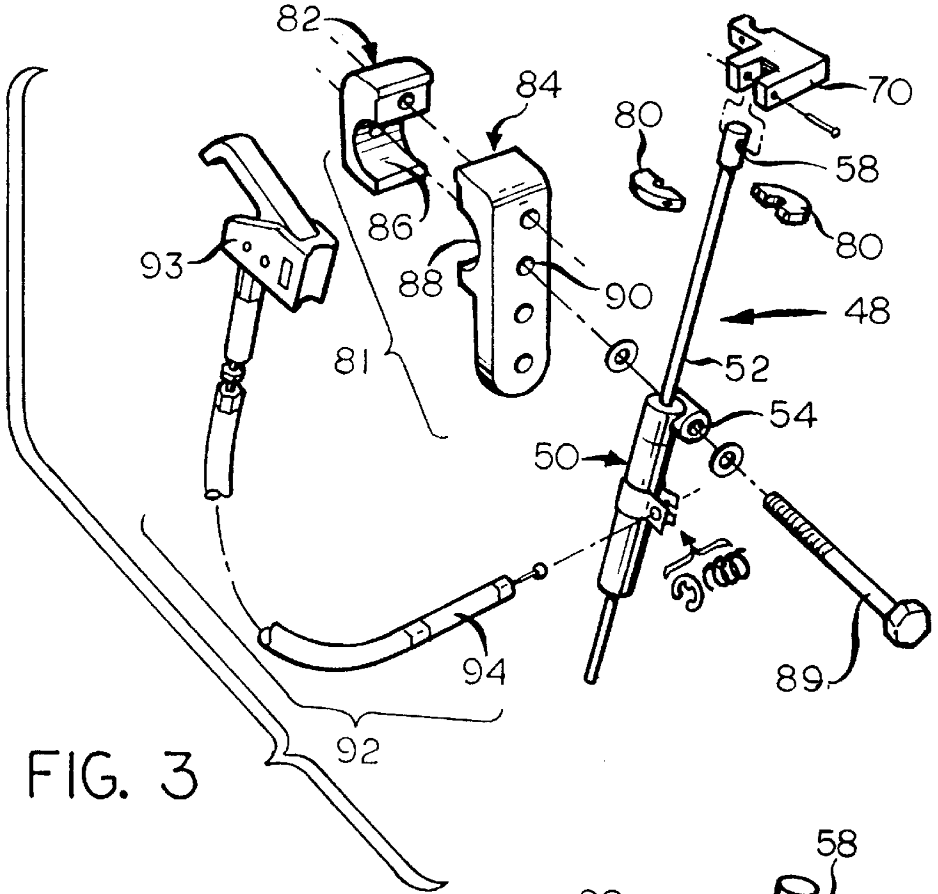
FIG. 3 is an enlarged exploded perspective view of the brace shown in FIG. 2.
Figure 4:
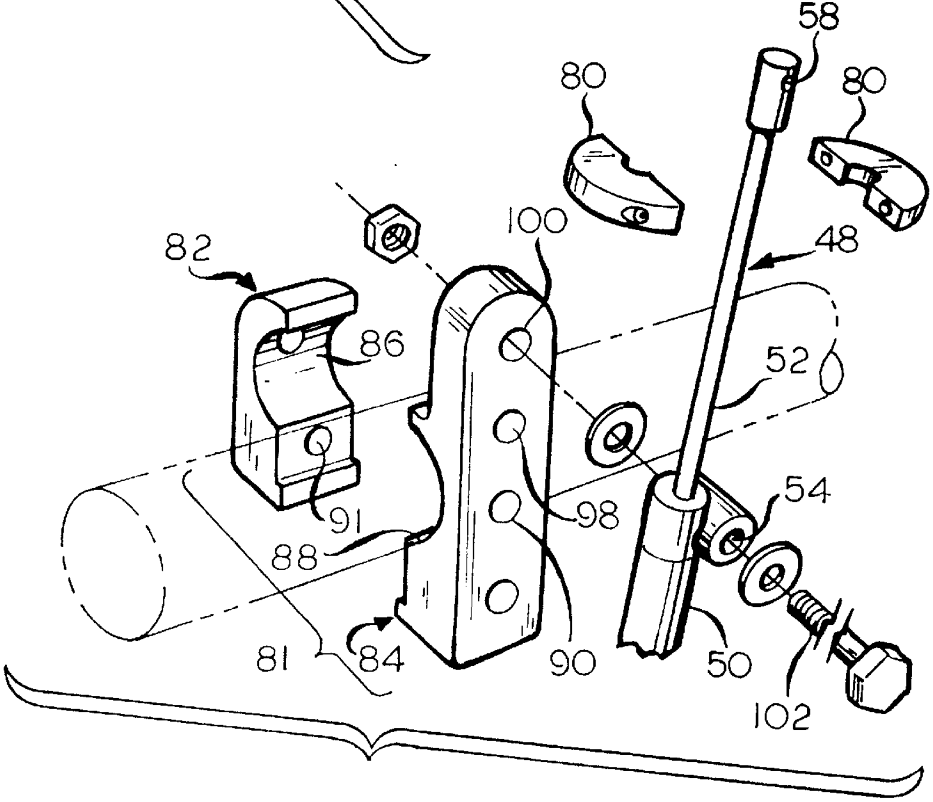
FIG. 4 is an enlarged schematic perspective view of the bracket of FIG. 3, in an inverted orientation.

As shown in FIGS. 3 and 4, the brace 48 further includes a split collar 80 for the purpose of limiting the angle of recline. A mounting assembly 81, consisting of coacting short and long mounting brackets 82, 84, is used to mount the brace 48 to the top tube 26 of the side frame 12 (shown in FIG. 1). The short and long mounting brackets 82, 84 are provided with concave tube-conforming inner surfaces 86 and 88, respectively to enable the mounting brackets 82, 84 to be securely attached to the top tube 26. When mounted in a first or standard position, as shown in FIG. 3, the bolt 89 passes through the bolt hole 54 in the brace 48, through mounting hole 90 in the long mounting bracket 84, through the mounting hole 56 in the frame top tube 26 (seen in FIG. 2), and through the short bracket hole 91 (clearly shown in FIG. 4). Also, a locking mechanism 92 (shown in FIG. 3), including trigger 93 and cable 94 can be positioned or arranged and dimensioned to lock the brace 48 at a desired length of extension. The locking mechanism 92 is operatively connected to the brace housing 50 to stop further extension or prevent axial movement of the extensible rod 52 from or relative to the housing 50.

There are circumstances where it is desired to mount the brace 48 at a higher position, such as when a thicker seat cushion 14 is substituted for a thin seat, resulting in a need to raise the entire seat back 16. In such a case, the mounting bracket assembly 81 can be inverted to provide mounting at a higher level. The mounting bracket assembly 81 is shown inverted in FIG. 4, where the mounting brackets 82, 84 of the mounting bracket assembly 81 are inverted and used to clamp to the top tube 26 of the side frame 12. There are two remaining holes 98 and 100 in the long mounting bracket 84, and the brace 48 can be connected to the mounting bracket assembly 81 using either of these two holes 98 or 100 as desired to raise the height of the brace 48. The brace 48 can be attached to the long mounting bracket 84 by any suitable means, such as bolt 102 passing through the bolt hole 54. It can be seen that, by inverting the mounting bracket assembly 81, the brace 48 can be moved to either of two higher mounting positions, for example, through bolt holes 98 or 100.

Figure 5:
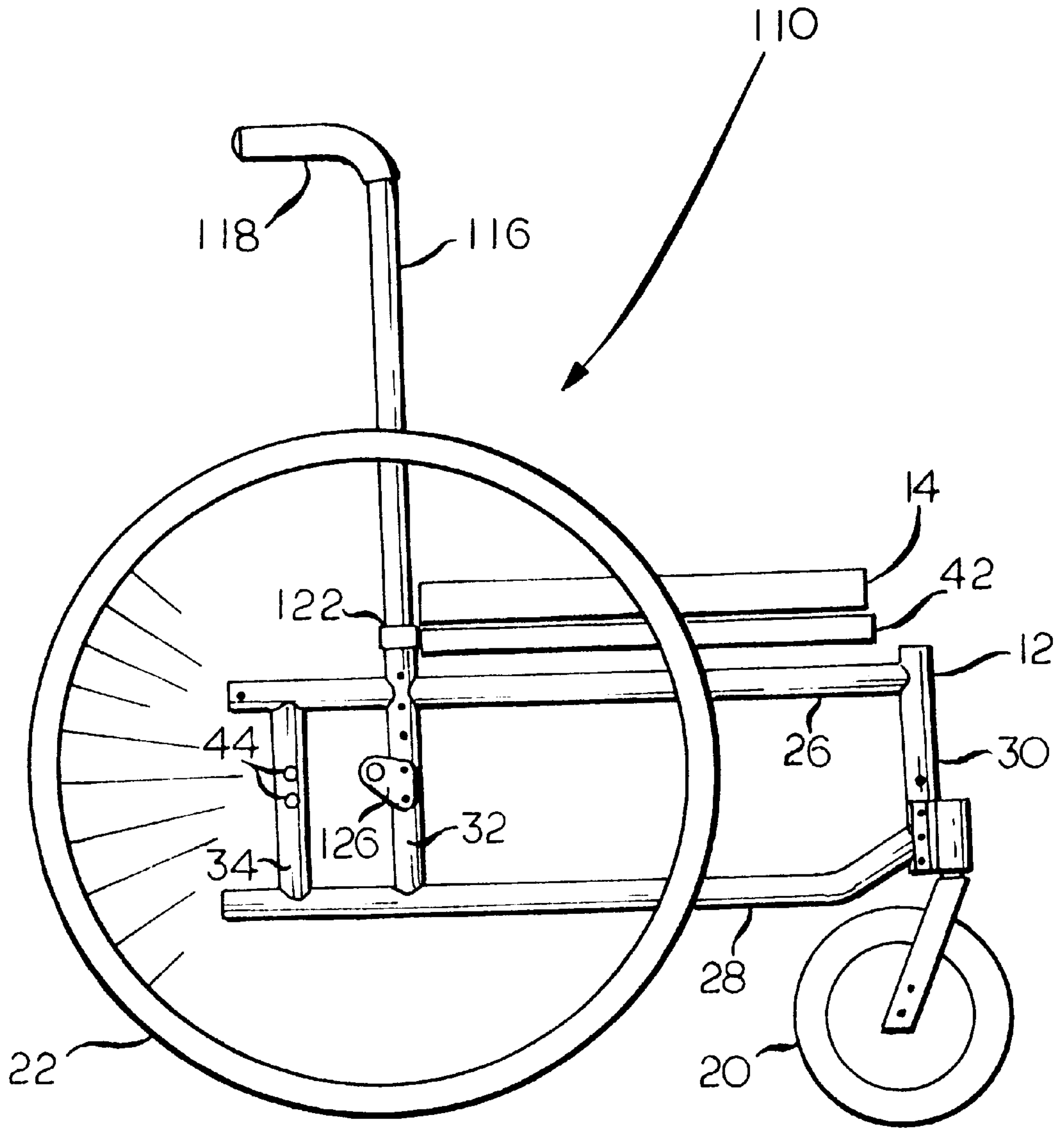
FIG. 5 is a schematic view in elevation of the wheelchair of the wheelchair shown in FIG. 1 after the wheelchair has been converted to a standard, non-reclining wheelchair.
Figure 6:
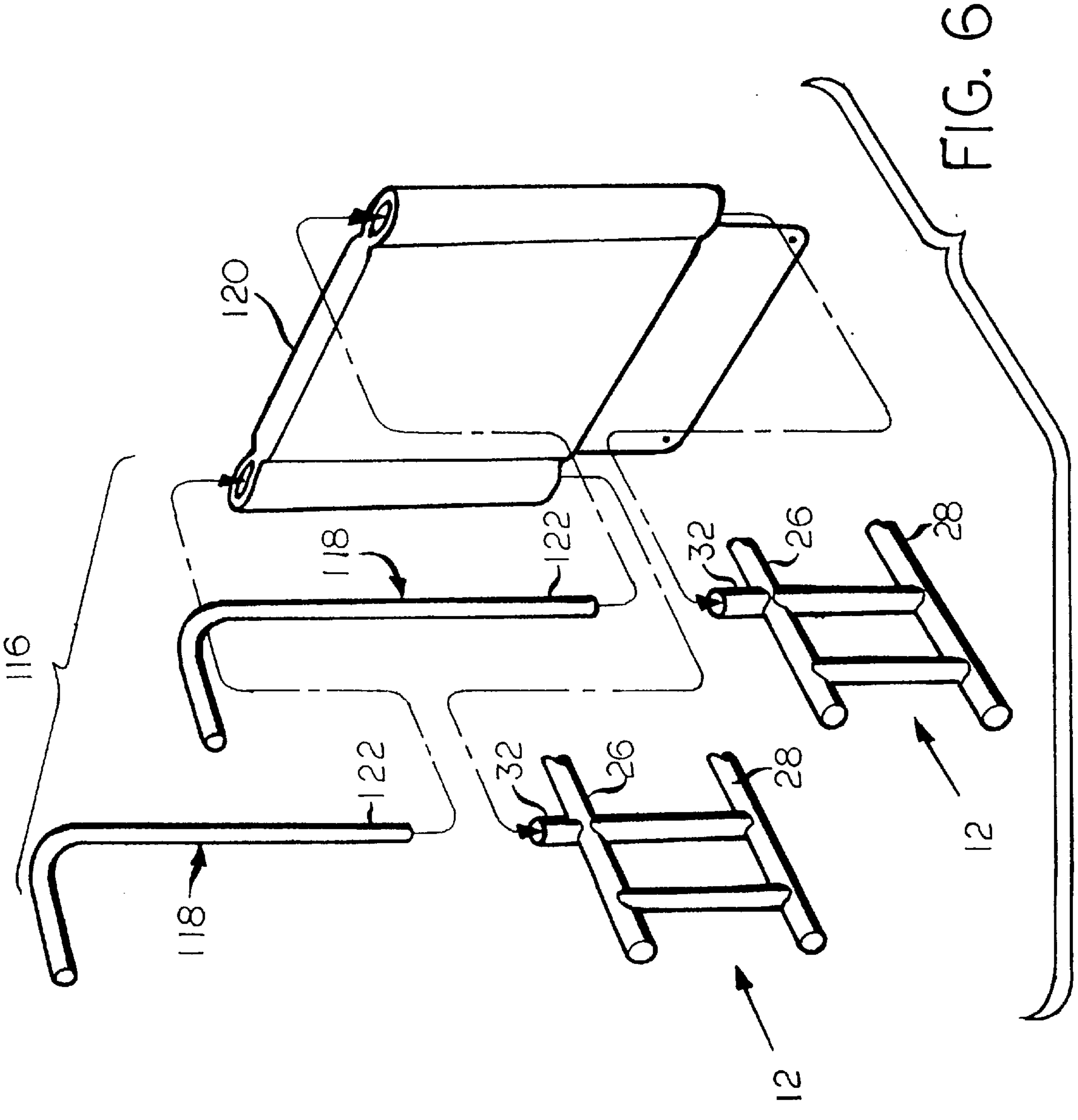
FIG. 6 is an exploded perspective view of the seat back of the wheelchair of FIG. 5.

In order to convert the wheelchair from a recliner wheelchair 10, shown in FIG. 1, to a standard wheelchair 110, shown in FIG. 5, a substantial portion of the reclining apparatus must be removed from the wheelchair. The seat back 16, and all of the stabilizer assembly 18 and the seat back frame 60, including the seat back tubes 62, the pivot tubes 64, and the braces 48, must be removed. Generally speaking, all of the apparatus illustrated in FIG. 2, except for the frame 12, must be removed. A new non-reclining seat 116, as shown in FIGS. 5 and 6, consists of push handles 118 and upholstery 120 (more clearly shown in FIG. 6). The base or lower portion 122 of the push handles 118 is shaped to fit telescopically into the back tube 32 of the side frame 12, in a manner similar to the fit of the pivot tubes 64 into the back tube 32. Without the pivot tubes 64 in place, the push handles 118 are rigidly mounted in the back tube 32, and the seat back 116 does not recline. In this way, the side frame 12 is structured and configured to selectively support a seat back pivotally for reclining (as shown in FIG. 1) about left and right pivot points 24, or alternatively to support a seat back rigidly mounted for non-reclining.

Figure 7:
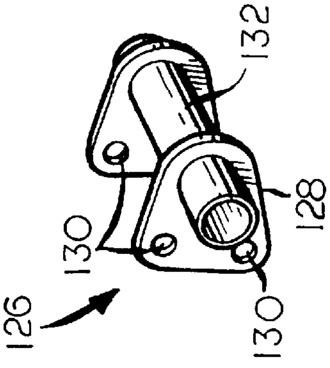
FIG. 7 is an enlarged schematic view in perspective of the axle bracket of the wheelchair illustrated in FIG. 5.

When the wheelchair is converted from a recliner 10 to a standard wheelchair 110, the rearward mounting of the wheel axle on the rear tube 34 (at points 44 in FIG. 1) is no longer necessary. Also, upon conversion to a standard wheelchair 110, it may become desirable for the wheelchair occupant to be able to use freely and conveniently the rear wheels 22 for self-propulsion. Therefore, it can be seen that it is advantageous for the rear wheels 22 to be selectively supported by the side frames 12 in a first, rearward position and a second, forward position to accommodate a change, or changes, in the center of gravity and to permit free and convenient use of the rear wheels 22. One way to permit free and convenient use of the rear wheels 22 is to move the rear wheels 22 forwardly so that they are mounted from the back tube 32 rather than from the rear tube 34. This is accomplished by attaching axle bracket 126 to the back tube 32, as opposed to being attached to the rear tube 34 of the reclining wheelchair 10 described above. As shown in FIG. 7, the axle bracket 126 includes two flanges 128, each with two mounting holes 130 for attachment by bolts, not shown. Extending through the flanges 128 is an axle tube 132 for receiving the axle (not shown) of the drive wheel 22 when the seat back 116 is rigidly mounted for non-reclining. If desired, the axle tube 132 can be configured to receive a quick release axle (not shown) for greater ease in partial disassembly.

As noted above, one of the important aspects of reclining wheelchairs is that of the relationship between the pivot point 24 and the seat back 16. It is important that the pivot point 24 be substantially vertically positioned substantially or approximately at the top edge of the seat cushion 14 for a proper fit with the wheelchair occupant's back, even when the seat back 16 is reclined.

Figure 10:
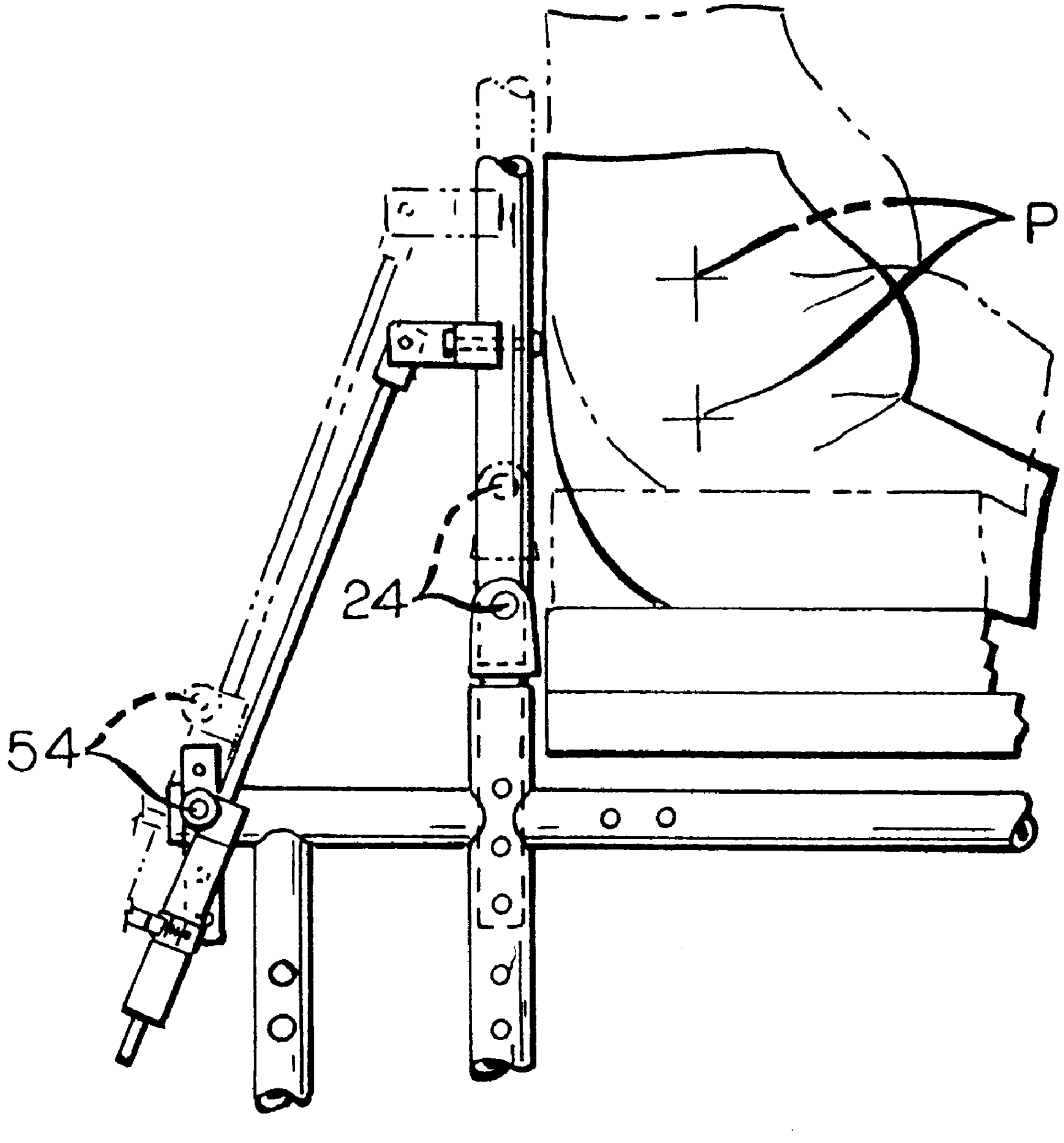
FIG. 10 is a slightly enlarged partial schematic view in elevation illustrating the relative positions of the pivot points of the seat back, the seat back brace, and the wheelchair occupant's upper torso with the thicker seat cushion shown in FIG. 9 in phantom lines.

This is an even more critical requirement in a recliner wheelchair, such as the wheelchair 10 shown in FIG. 1. When either the occupant or the attendant change the angle of recline, both the wheelchair seat back 16 and the torso of the wheelchair occupant pivot, but if the pivot points are not at the same general location, the seat back 16 will move relative to the back or torso of the occupant. This relative movement will cause a shearing effect, creating an undesirable pulling or longitudinal force on the occupant's clothing. Accordingly, the wheelchair 10 of the invention is dimensioned and configured to maintain substantially fixed positions of the pivot points of the wheelchair seat back 16 relative to the pivot points of the back or torso of the wheelchair occupant. "Substantially fixed positions" means close proximate positions relative to one another. That is to say, the pivot points 24 and 54 of the reclining seat back 16 and of the brace 48 remain a substantial constant distance away from the wheelchair occupant's torso pivot point P, as illustrated in FIG. 10. This is accomplished by providing for the raising and lowering of the pivot point 24 of the seat back 16 to accommodate both the occupant's particular body features, (i.e., the occupant's torso pivot point), and the height or thickness of the seat cushion 14.

Figure 9:
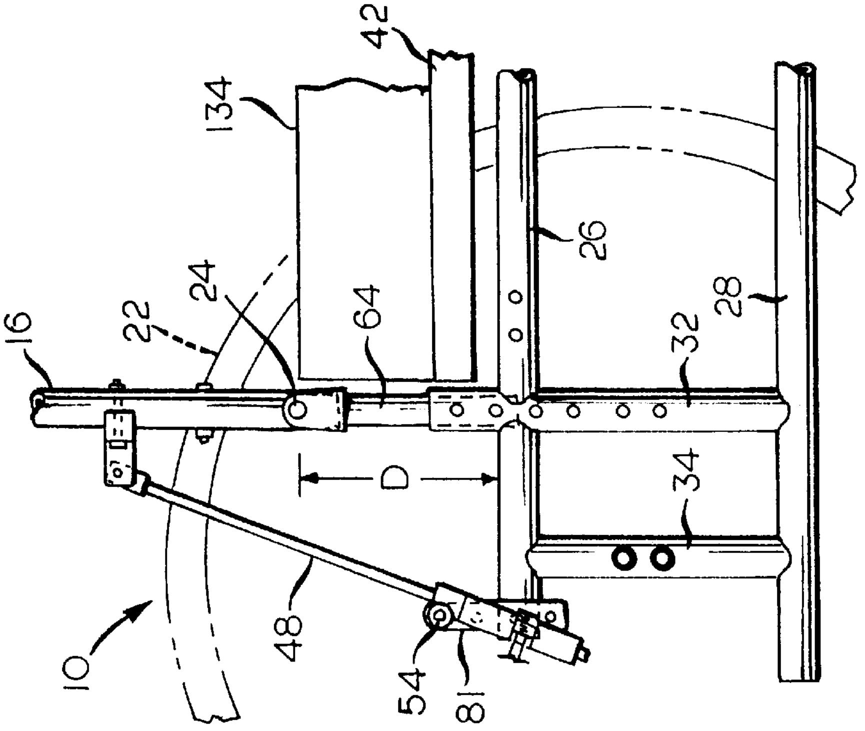
FIG. 9 is a partial schematic view similar to FIG. 8, with the seat back raised to accommodate a thicker seat cushion.
Figure 8:
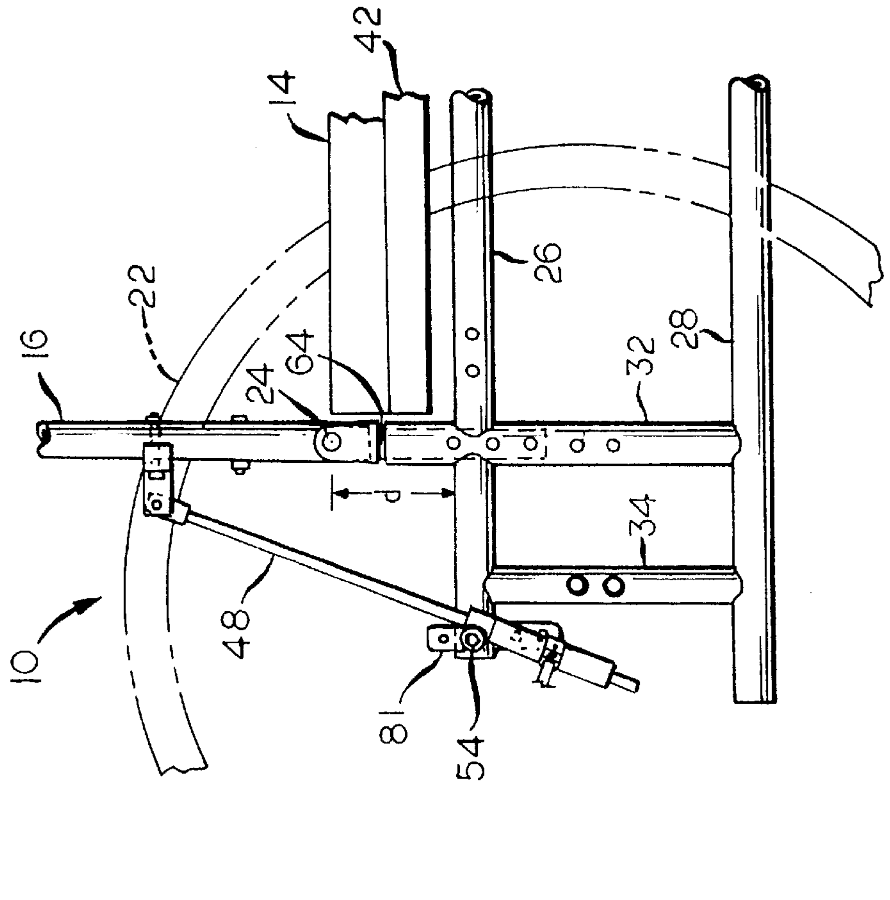
FIG. 8 is a slightly enlarged partial schematic view in elevation illustrating the position of the hinge points for the seat back and the seat back brace when the wheelchair is configured as a recliner.

As shown in FIG. 8, wheelchair 10 has a relatively thin seat cushion 14. The seat back 16 is hinged at pivot point 24, and the seat back brace 48 is pivotally mounted to support the seat back 16, with the pivot point 54 extending through the bolt hole 56 (shown in FIG. 2) in the top tube 26. However, when a thicker seat cushion 134 is substituted for the thin seat cushion 14, as shown in FIG. 9, the pivot point 24 can be raised to accommodate the change. This is illustrated by referring to the distance "d" shown in FIG. 8 between the pivot point 24 and the top tube 26 of the side frame 12. After the height adjustment, as shown in FIG. 9, the distance between the pivot point 24 and the top tube 26 is an increased distance "D". Without this height adjustment, the pivot point 24 would be below the top surface of the thicker cushion 134, and the result would be an increased tendency for shear during reclining of the seat back 16.

The height adjustment of the pivot point 24 for the seat back 16 is accomplished by raising the pivot brackets 64 telescopically within the back tubes 32. The height adjustment for the pivot point 54 or bolt hole 56 on the brace 48 is accomplished by disassembling the mounting assembly 81 and reattaching the mounting assembly 81 onto the top tube 26 in the inverted position shown in FIG. 4. The pivot point 54, or bolt hole 56, can then be aligned with either of the higher two holes 98 or 100 in the long mounting bracket 84. Accordingly, it can be seen that to accommodate a change in height or thickness of the seat cushion, both a height adjustment in the seat back 16 and in the support brace 48 can be made, thereby maintaining the pivot point 24 of the seat back 16 in the vicinity of the natural pivot point of the wheelchair occupant.

The principle and mode of operation of this invention have been described in its preferred embodiment. However, it should be noted that this invention may be practiced otherwise than as specifically illustrated and described without departing from the scope of the invention.

What is claimed is:

1. A wheelchair comprising:

a frame supporting a seat cushion having a top edge;

a seat back hinged to said frame at seat back pivot points, said seat back pivot points being adjustable relative to the top edge of the seat cushion supported by said frame;

a seat back brace;

a mounting assembly pivotally mounting said seat back brace relative to said frame at seat back brace pivot points, said seat back brace pivot points being adjustable in height by inverting said mounting assembly; and pivot tubes, said seat back pivot points being on said pivot tubes, said frame comprising hollow back tubes, said pivot tubes being telescopically engageable with said hollow back tubes, said seat back pivot points being adjustable in height by raising and lowering said pivot tubes relative to said hollow back tubes.

2. A wheelchair according to claim 1, wherein said mounting assembly is removably attachable to said frame; and said seat back brace is pivotally and removably attached to mounting assembly so that said mounting assembly may be removed, inverted and reattached to said frame to adjust the height of said seat back brace pivot points.

3. A wheelchair comprising:

side frames for supporting a seat cushion having a top edge, said side frames comprising a top tube and a back tube;

a seat back pivotally mounted relative to said back tube of said side frames at seat back pivot points;

an adjustable brace assembly comprising a pair of braces, said braces being pivotally mounted relative to said top tube at brace pivot points;

pivot tubes, said seat back pivot points being on said pivot tubes, said back tubes of said frame being hollow, said pivot tubes being insertable into said hollow back tubes, said pivot tubes being adjustable relative to said hollow back tubes; and a mounting assembly comprising coacting mounting brackets structured and dimensioned to mount said braces to said top tubes of said side frames, said mounting brackets each being provided with a tube-conforming surface to enable said mounting brackets to be attached to said top tubes of said side frames, said mounting brackets being structured and configured to be inverted to provide mounting of said brace at adjustable heights.

4. A wheelchair comprising:

a frame for supporting a seat cushion having a top edge;

a seat back hinged to said frame at seat back pivot points, said seat back pivot points being adjustable relative to the top edge of the seat cushion supported by said frame;

a seat back brace pivotally mounted to said seat back and said frame at a seat back brace pivot point to support said seat back, said seat back brace pivot point being adjustable in height; and a mounting assembly pivotally mounting said seat back brace relative to said frame, said seat back brace pivot point being adjustable in height by inverting said mounting assembly.

5. A wheelchair according to claim 4, wherein said mounting assembly is removably attachable to said frame; and said seat back brace is pivotally and removably attached to mounting assembly so that said mounting assembly may be removed, inverted and reattached to said frame to adjust the height of s aid seat back brace pivot points.

* * * * *